US012587833B2

(12) United States Patent
Srinivasa Gopalan et al.

(10) Patent No.: US 12,587,833 B2
(45) Date of Patent: Mar. 24, 2026

(54) METHODS AND DEVICE FOR CONFIGURING A UWB SYSTEM

(71) Applicant: Samsung Electronics Co., Ltd., Gyeonggi-do (KR)

(72) Inventors: Karthik Srinivasa Gopalan, Bangalore (IN); Ankur Bansal, Bangalore (IN); Aniruddh Rao Kabbinale, Bangalore (IN)

(73) Assignee: Samsung Electronics Co., Ltd (KR)

( * ) Notice: Subject to any disclaimer, the term of this patent is extended or adjusted under 35 U.S.C. 154(b) by 377 days.

(21) Appl. No.: 18/021,623

(22) PCT Filed: Aug. 17, 2021

(86) PCT No.: PCT/KR2021/010869
§ 371 (c)(1),
(2) Date: Feb. 16, 2023

(87) PCT Pub. No.: WO2022/039466
PCT Pub. Date: Feb. 24, 2022

(65) Prior Publication Data
US 2023/0308863 A1      Sep. 28, 2023

(30) Foreign Application Priority Data

| | | |
|---|---|---|
| Aug. 17, 2020 | (IN) | 202041035425 |
| Aug. 11, 2021 | (IN) | 202041035425 |

(51) Int. Cl.
H04W 76/10        (2018.01)
G01S 13/02        (2006.01)
(Continued)

(52) U.S. Cl.
CPC .......... H04W 8/24 (2013.01); G01S 13/0209 (2013.01); H04L 41/084 (2013.01); H04W 4/50 (2018.02)

(58) Field of Classification Search
None
See application file for complete search history.

(56) References Cited

U.S. PATENT DOCUMENTS

| | | |
|---|---|---|
| 2013/0217332 A1 | 8/2013 | Allman et al. |
| 2014/0133656 A1 | 5/2014 | Wurster et al. |
| | (Continued) | |

FOREIGN PATENT DOCUMENTS

| | | |
|---|---|---|
| CN | 110495196 | 11/2019 |
| EP | 1 388 966 | 2/2004 |
| KR | 1020140144684 | 12/2014 |

OTHER PUBLICATIONS

European Search Report dated Jan. 15, 2024 issued in counterpart application No. 21858553.7-1216, 11 pages.
(Continued)

*Primary Examiner* — Gary Lafontant
(74) *Attorney, Agent, or Firm* — The Farrell Law Firm, P.C.

(57) ABSTRACT

The embodiments herein disclose methods for configuring an UWB system. The method includes defining, by a first UWB device, a plurality of predefined configuration associated with a plurality of service in the first UWB device, selecting, by the first UWB device, at least one predefined configuration from the plurality of predefined configuration to be shared with at least one second UWB device, sharing, by the first UWB device, at least one of an ID of the at least one predefined configuration from the plurality of predefined configuration, a deviated parameter and a deviated parameter value combined with the ID of the predefined configuration from the plurality of predefined configuration to the at least one second UWB device based on the selection.

8 Claims, 5 Drawing Sheets

(51) Int. Cl.
    *H04L 41/084*      (2022.01)
    *H04W 4/50*       (2018.01)
    *H04W 8/24*       (2009.01)

(56) References Cited

U.S. PATENT DOCUMENTS

| | | |
|---|---|---|
| 2014/0287719 A1 | 9/2014 | Mueck |
| 2017/0070847 A1 | 3/2017 | Altman et al. |
| 2017/0161530 A1 | 6/2017 | Tumer et al. |
| 2018/0041292 A1 | 2/2018 | Baines |
| 2018/0176009 A1 | 6/2018 | Agerstam et al. |
| 2022/0322347 A1 | 10/2022 | Yang |
| 2022/0375286 A1* | 11/2022 | Pirch ........................ H04B 1/69 |

OTHER PUBLICATIONS

PCT/ISA/210 Search Report issued on PCT/KR2021/010869, Nov. 29, 2021, pp. 4.
PCT/ISA/237 Written Opinion issued on PCT/KR2021/010869, Nov. 29, 2021, pp. 5.
Indian Examination Report dated Mar. 25, 2022, issued in counterpart application No. IN 202041035425, pp. 7.
Korean Office Action dated Oct. 22, 2025 issued in counterpart application No. 10-2023-7009077, 11 pages.

\* cited by examiner

[Fig. 1]
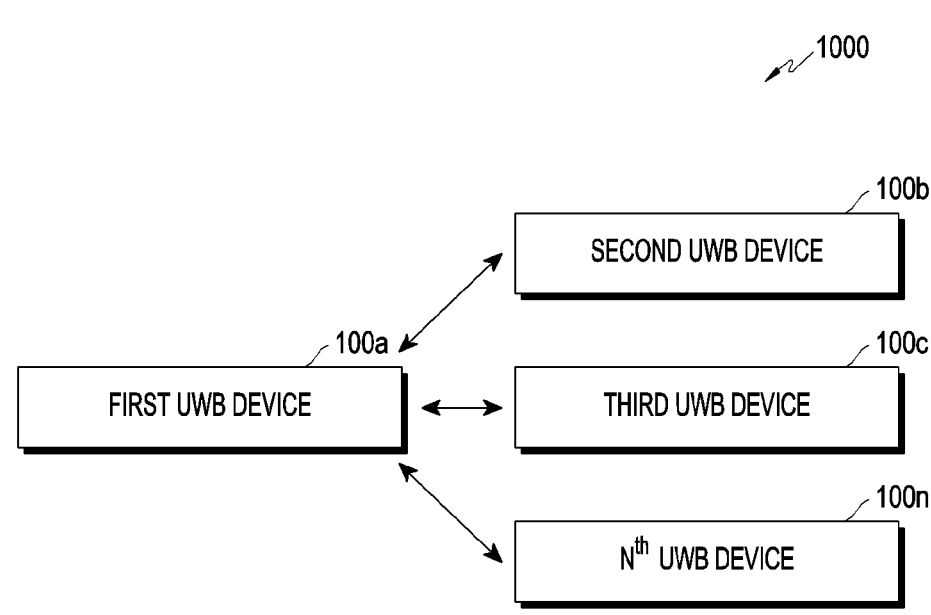
[Fig. 2]
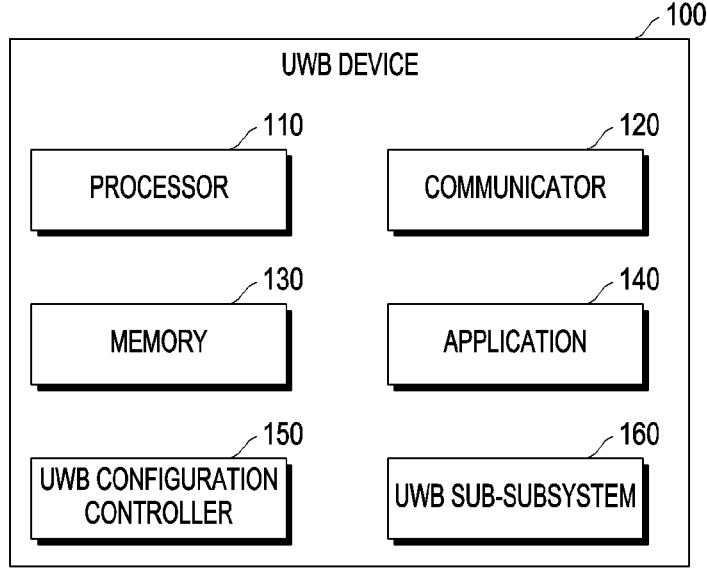

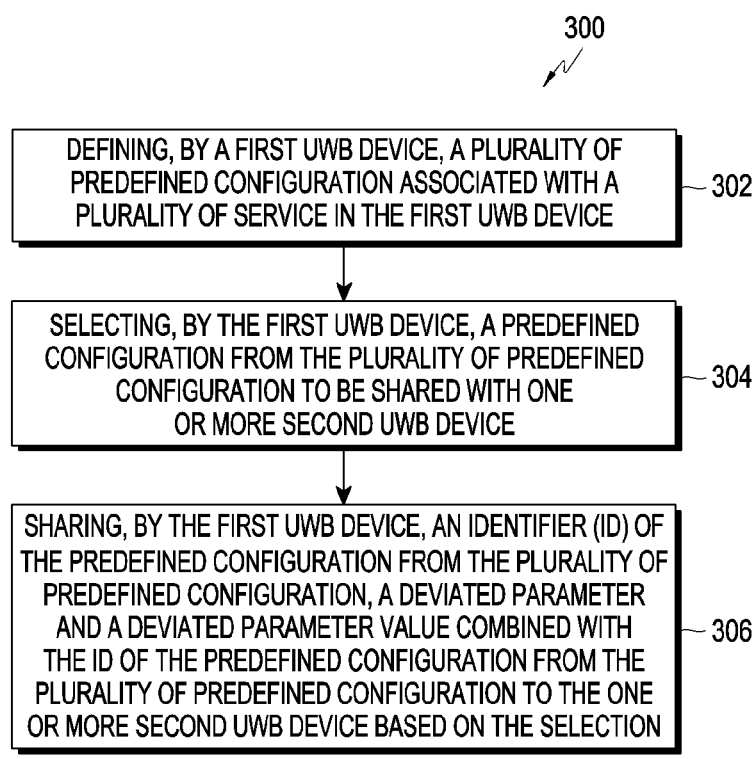

DEFINING, BY A FIRST UWB DEVICE, A PLURALITY OF PREDEFINED CONFIGURATION ASSOCIATED WITH A PLURALITY OF SERVICE IN THE FIRST UWB DEVICE — 302

SELECTING, BY THE FIRST UWB DEVICE, A PREDEFINED CONFIGURATION FROM THE PLURALITY OF PREDEFINED CONFIGURATION TO BE SHARED WITH ONE OR MORE SECOND UWB DEVICE — 304

SHARING, BY THE FIRST UWB DEVICE, AN IDENTIFIER (ID) OF THE PREDEFINED CONFIGURATION FROM THE PLURALITY OF PREDEFINED CONFIGURATION, A DEVIATED PARAMETER AND A DEVIATED PARAMETER VALUE COMBINED WITH THE ID OF THE PREDEFINED CONFIGURATION FROM THE PLURALITY OF PREDEFINED CONFIGURATION TO THE ONE OR MORE SECOND UWB DEVICE BASED ON THE SELECTION — 306

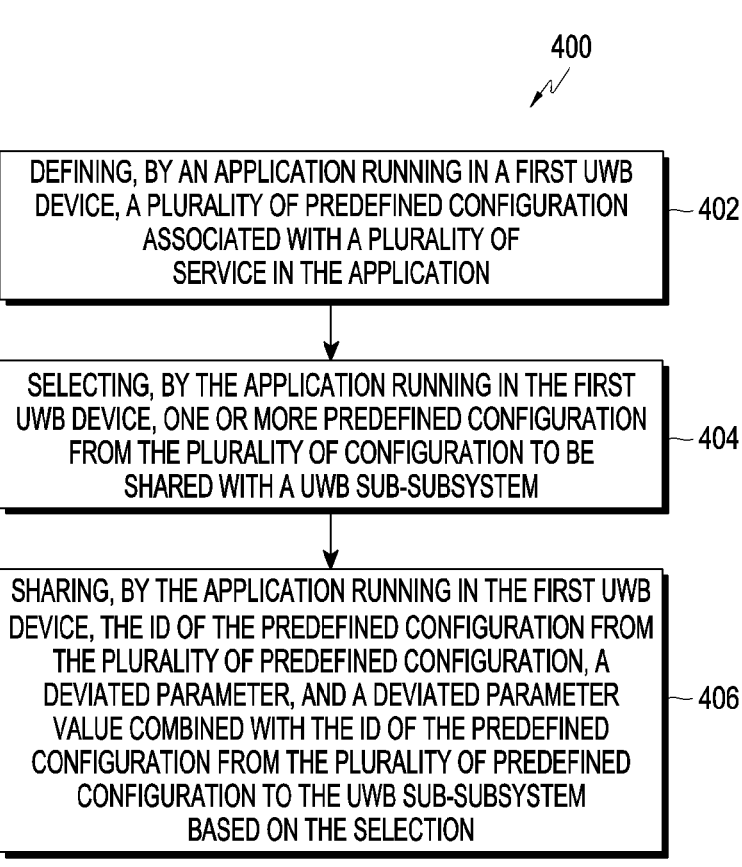

DEFINING, BY AN APPLICATION RUNNING IN A FIRST UWB DEVICE, A PLURALITY OF PREDEFINED CONFIGURATION ASSOCIATED WITH A PLURALITY OF SERVICE IN THE APPLICATION — 402

SELECTING, BY THE APPLICATION RUNNING IN THE FIRST UWB DEVICE, ONE OR MORE PREDEFINED CONFIGURATION FROM THE PLURALITY OF CONFIGURATION TO BE SHARED WITH A UWB SUB-SUBSYSTEM — 404

SHARING, BY THE APPLICATION RUNNING IN THE FIRST UWB DEVICE, THE ID OF THE PREDEFINED CONFIGURATION FROM THE PLURALITY OF PREDEFINED CONFIGURATION, A DEVIATED PARAMETER, AND A DEVIATED PARAMETER VALUE COMBINED WITH THE ID OF THE PREDEFINED CONFIGURATION FROM THE PLURALITY OF PREDEFINED CONFIGURATION TO THE UWB SUB-SUBSYSTEM BASED ON THE SELECTION — 406

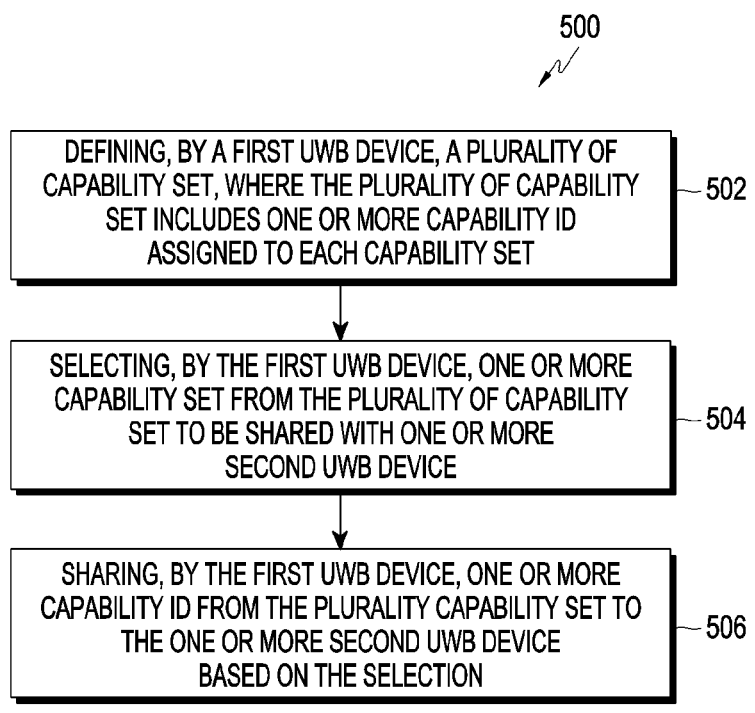

DEFINING, BY A FIRST UWB DEVICE, A PLURALITY OF CAPABILITY SET, WHERE THE PLURALITY OF CAPABILITY SET INCLUDES ONE OR MORE CAPABILITY ID ASSIGNED TO EACH CAPABILITY SET — 502

SELECTING, BY THE FIRST UWB DEVICE, ONE OR MORE CAPABILITY SET FROM THE PLURALITY OF CAPABILITY SET TO BE SHARED WITH ONE OR MORE SECOND UWB DEVICE — 504

SHARING, BY THE FIRST UWB DEVICE, ONE OR MORE CAPABILITY ID FROM THE PLURALITY CAPABILITY SET TO THE ONE OR MORE SECOND UWB DEVICE BASED ON THE SELECTION — 506

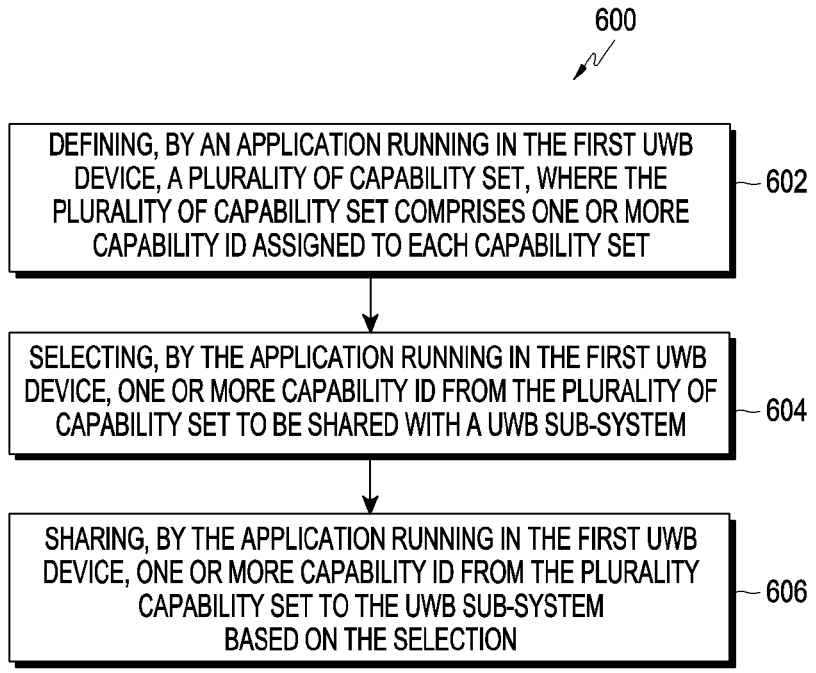

DEFINING, BY AN APPLICATION RUNNING IN THE FIRST UWB DEVICE, A PLURALITY OF CAPABILITY SET, WHERE THE PLURALITY OF CAPABILITY SET COMPRISES ONE OR MORE CAPABILITY ID ASSIGNED TO EACH CAPABILITY SET — 602

SELECTING, BY THE APPLICATION RUNNING IN THE FIRST UWB DEVICE, ONE OR MORE CAPABILITY ID FROM THE PLURALITY OF CAPABILITY SET TO BE SHARED WITH A UWB SUB-SYSTEM — 604

SHARING, BY THE APPLICATION RUNNING IN THE FIRST UWB DEVICE, ONE OR MORE CAPABILITY ID FROM THE PLURALITY CAPABILITY SET TO THE UWB SUB-SYSTEM BASED ON THE SELECTION — 606

[Fig. 7]
700
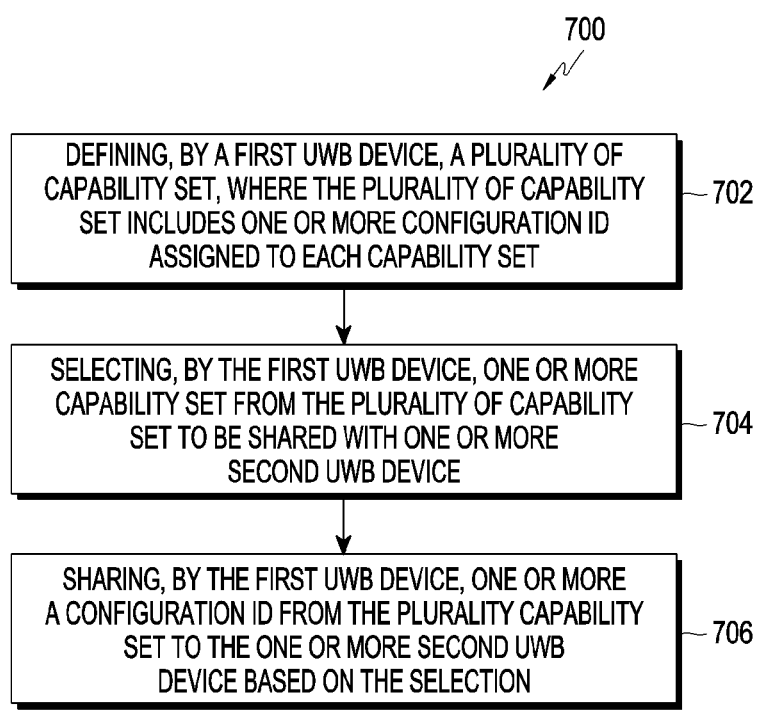
[Fig. 8]
800
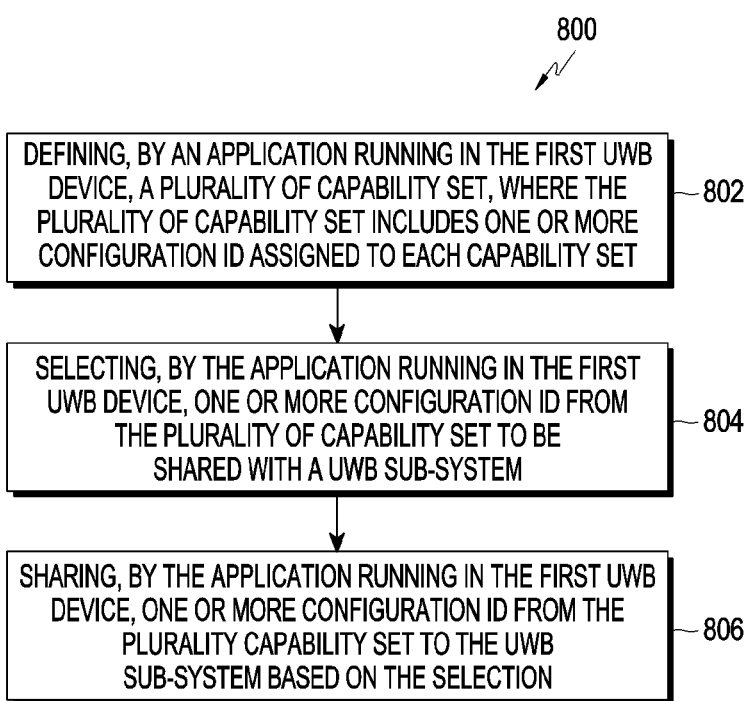

[Fig. 9]
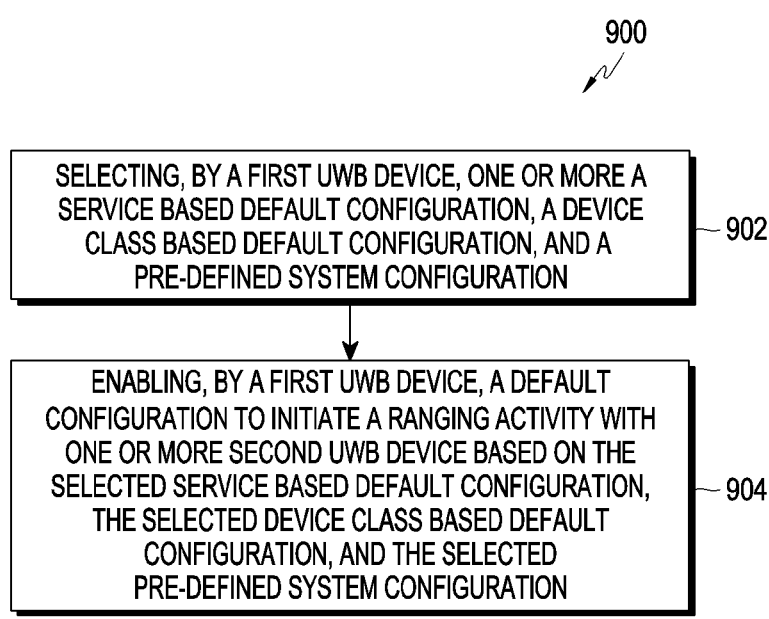
[Fig. 10]
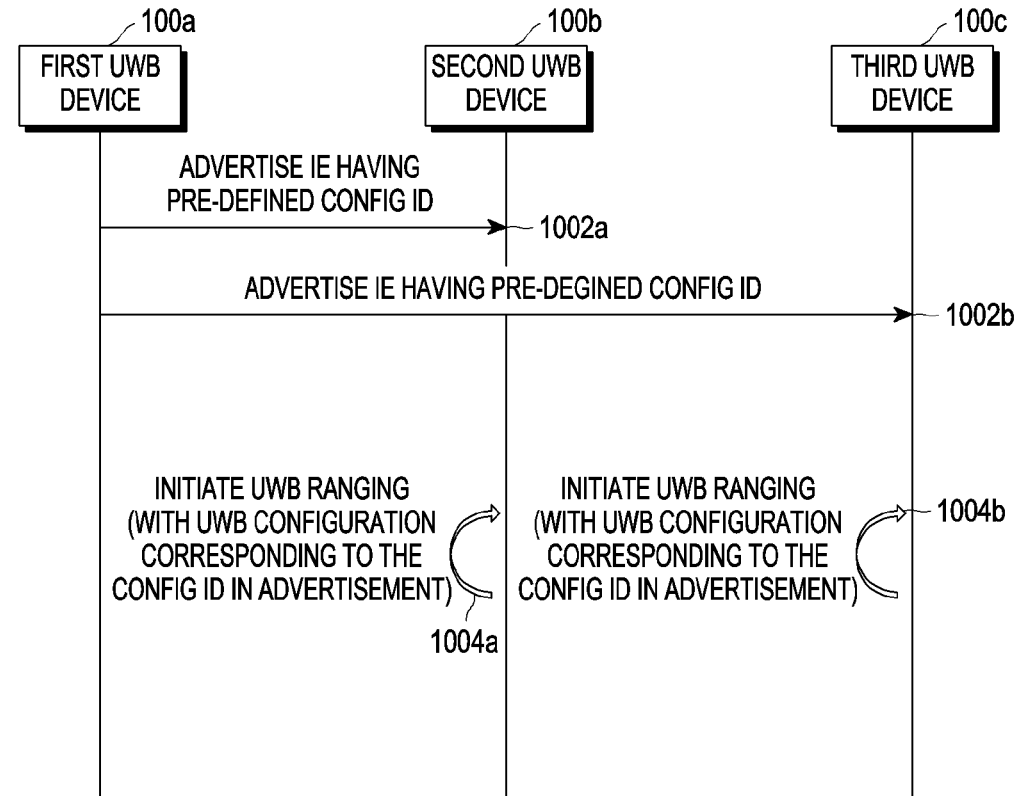

METHODS AND DEVICE FOR CONFIGURING A UWB SYSTEM

CROSS-REFERENCE TO RELATED APPLICATIONS

This application is a U.S. National Phase Entry of PCT International Application No. PCT/KR2021/010869, which was filed on Aug. 17, 2021, and claims priority to Indian patents application Ser. Nos. 202041035425 and 202041035425, which were filed in the Indian Intellectual Property Office on Aug. 17, 2020, and Aug. 11, 2021, respectively, the entire disclosure of each of which is incorporated herein by reference.

TECHNICAL FIELD

Embodiments disclosed herein relate to Ultra-Wide Band (UWB) systems and more particularly to enabling a default configuration and a predefined configuration in the UWB systems.

BACKGROUND ART

In order to enable UWB ranging between UWB devices, IEEE 802.15.4z specifies that capability and configuration are exchanged between the UWB devices. For example, a controlee provides its capabilities to a controller and the controller UWB device should configure the controlee device prior to ranging. Also, an application needs to set configuration to the UWB device via an Application programming interface (API). Currently, this involves exchanging a number of parameters between the UWB devices prior to the start of ranging and exchanging a number of parameters between the application and the UWB device via the API. This is time consuming and inefficient.

Different service verticals and use cases need different configuration of the UWB devices. This leads to exchanging various sets of configuration parameters between the UWB devices that support multiple services and exchanging various sets of configuration parameters between the application and the UWB device via the API. There is no method to exchange these various configurations efficiently.

For communicating configuration and capability parameters between UWB devices, wherein the A first UWB device sends a set of capability parameters to the second UWB device; and The second UWB device sends a set of configuration parameters to the first UWB device.

For communicating configuration parameters/capability parameters between the application and the UWB device (via the API), wherein the application receives a set of capabilities from the UWB device; and the application sends a set of configuration parameters to the UWB device.

Thus, it is desired to address the above mentioned disadvantages or other shortcomings or at least provide a useful alternative.

DISCLOSURE OF INVENTION

Technical Problem

The principal object of the embodiments herein is to disclose methods and a UWB device for configuring an UWB system.

Another object of the embodiments herein is to set a default configuration when no new set of configurations are exchanged before starting ranging between UWB devices.

Another object of the embodiments herein is to set a default configuration when no new set of configurations are exchanged before starting ranging between an application and the UWB device via an API.

Another object of the embodiments herein is to share predefined configuration using an ID between the UWB devices.

Another object of the embodiments herein is to share predefined configuration using an ID between the application and the UWB device via an API.

Another object of the embodiments herein is to share a pre-defined configuration with deviation to values of some of the parameters between the UWB devices.

Another object of the embodiments herein is to share a pre-defined configuration with deviation to values of some of the parameters between the application and the UWB device via the API Another object of the embodiments herein is to share capabilities using predefined ID, where each ID maps to a set of predefined capabilities between the UWB devices and between the application and the UWB device via an API.

Another object of the embodiments herein is to share capabilities as set of supported predefined configurations (in the form of IDs) between the UWB devices and between the application and the UWB device via an API.

Solution to Problem

Accordingly, the embodiments herein disclose methods for configuring an UWB system. The method includes defining, by a first UWB device, a plurality of predefined configuration associated with a plurality of service in the first UWB device. Further, the method includes selecting, by the first UWB device, at least one predefined configuration from the plurality of predefined configuration to be shared with at least one second UWB device. Further, the method includes sharing, by the first UWB device, at least one of an ID of the at least one predefined configuration from the plurality of predefined configuration, a deviated parameter and a deviated parameter value combined with the ID of the predefined configuration from the plurality of predefined configuration to the at least one second UWB device based on the selection.

In an embodiment, the at least one ID comprises at least one information element (IE), wherein the at least one IE comprises at least one of a configuration ID, a device ID, a number of devices, a service ID, at least one subset associated with the configuration ID, a number of parameter subsets, the deviation parameter and a value associated with the deviated parameter.

In an embodiment, the at least one ID of predefined configuration from the plurality of predefined configuration, the deviated parameter and the deviated parameter value combined with the ID of the predefined configuration is shared using an advertisement message, a push notification, and a short range communication message.

In an embodiment, defining, by the first UWB device, the plurality of predefined configuration comprises saving the plurality of predefined configuration at the first UWB device, communicating the plurality of predefined configuration to the at least one second UWB device and saving the plurality of predefined configuration at the at least one second UWB device.

Accordingly, the embodiments herein disclose methods for configuring an UWB system. The method includes defining, by an application running in a first UWB device, a plurality of predefined configuration associated with a plurality of service in the application. Further, the method includes selecting, by the application running in the first UWB device, at least one predefined configuration from the plurality of configuration to be shared with a UWB sub-subsystem. Further, the method includes sharing, by the application running in the first UWB device, at least one of an ID of the predefined configuration from the plurality of predefined configuration, a deviated parameter, and a deviated parameter value combined with the ID of the predefined configuration from the plurality of predefined configuration to the UWB sub-subsystem based on the selection.

Accordingly, the embodiments herein disclose methods for configuring an UWB system. The method includes defining, by a first UWB device, a plurality of capability set. The plurality of capability set includes at least one capability ID assigned to each capability set. Further, the method includes selecting, by the first UWB device, at least one capability set from the plurality of capability set to be shared with at least one second UWB device. Further, the method includes sharing, by the first UWB device, at least one of a capability ID from the plurality capability set to the at least one second UWB device based on the selection.

In an embodiment, the at least one capability ID is exchanged using an advertisement message, a push notification, and a short range communication message.

In an embodiment, defining, by the application running in the first UWB device, the plurality of predefined configuration includes saving the plurality of predefined configuration at the application running in the first UWB device, communicating the plurality of predefined configuration to the UWB sub-subsystem and saving the plurality of predefined configuration at the UWB sub-subsystem.

Accordingly, the embodiments herein disclose methods for configuring an UWB system. The method includes defining, by an application running in a first UWB device, a plurality of capability set, wherein the plurality of capability set comprises at least one capability ID assigned to each capability set. Further, the method includes selecting, by the application running in the first UWB device, at least one capability ID from the plurality of capability set to be shared with a UWB sub-system. Further, the method includes sharing, by the application running in the first UWB device, at least one of a capability ID from the plurality capability set to the UWB sub-system based on the selection.

In an embodiment, the at least one capability ID is shared using an advertisement message, a push notification, and a short range communication message.

In an embodiment, defining, by the first UWB device, the plurality of capability set comprises saving the plurality of capability at the first UWB device, communicating the plurality of capability set to the at least one second UWB device and saving the plurality of capability set at the at least one second UWB device.

Accordingly, the embodiments herein disclose methods for configuring an UWB system. The method includes defining, by a first UWB device, a plurality of capability set, wherein the plurality of capability set comprises at least one configuration ID assigned to each capability set. Further, the method includes selecting, by the first UWB device, at least one capability set from the plurality of capability set to be shared with at least one second UWB device. Further, the method includes sharing, by the first UWB device, at least one of a configuration ID from the plurality capability set to the at least one second UWB device based on the selection.

In an embodiment, the at least one configuration ID is shared using an advertisement message, a push notification, and a short range communication message.

In an embodiment, defining, by the application running in the first UWB device, the plurality of capability set comprises saving the plurality of capability set at the application running in the first UWB device, communicating the plurality of capability set to the UWB sub-subsystem and saving the plurality of capability set at the UWB sub-subsystem.

Accordingly, the embodiments herein disclose methods for configuring an UWB system. The method includes defining, by an application running in a first UWB device, a plurality of capability set, wherein the plurality of capability set comprises at least one configuration ID assigned to each capability set. Further, the method includes selecting, by the application running in the first UWB device, at least one configuration ID from the plurality of capability set to be shared with a UWB sub-system. The method includes sharing, by the application running in the first UWB device, at least one of a configuration ID from the plurality capability set to the UWB sub-system based on the selection.

In an embodiment, the at least one configuration ID is shared using an advertisement message, a push notification, and a short range communication message.

In an embodiment, defining, by the first UWB device, the plurality of capability set comprises saving the plurality of capability set at the first UWB device, communicating the plurality of capability set to the at least one second UWB device and saving the plurality of capability set at the at least one second UWB device.

Accordingly, the embodiments herein disclose methods for configuring an UWB system. The method includes selecting, by a first UWB device, at least one of a service based default configuration, a device class based default configuration, and a predefined system configuration. Further, the method includes enabling, by a first UWB device, at least one default configuration to initiate a ranging activity with at least one second UWB device based on at least one of the selected service based default configuration, the selected device class based default configuration, and the selected predefined system configuration.

Accordingly, the embodiments herein disclose an UWB device including a UWB configuration controller coupled with a processor and a memory. The UWB configuration controller is configured to define a plurality of predefined configuration associated with a plurality of service in the first UWB device. Further, the UWB configuration controller is configured to select at least one predefined configuration from the plurality of predefined configuration to be shared with at least one second UWB device. Further, the UWB configuration controller is configured to share at least one of an identifier (ID) of the at least one predefined configuration from the plurality of predefined configuration, a deviated parameter and a deviated parameter value combined with the ID of the predefined configuration from the plurality of predefined configuration to the at least one second UWB device based on the selection.

Accordingly, the embodiments herein disclose an UWB device including a processor, a memory, and a UWB configuration controller, coupled with the processor and the memory. An application runs in the first UWB device, wherein the application is, coupled with the UWB configuration controller, configured to define a plurality of predefined configuration associated with a plurality of service in the application, select at least one predefined configuration from the plurality of configuration to be shared with a UWB sub-subsystem, and share at least one of an identifier (ID) of the predefined configuration from the plurality of predefined configuration, a deviated parameter, and a deviated parameter value combined with the ID of the predefined configuration from the plurality of predefined configuration to the UWB sub-subsystem based on the selection.

Accordingly, the embodiments herein disclose an UWB device including a UWB configuration controller coupled with a processor and a memory. The UWB configuration controller is configured to define a plurality of capability set, wherein the plurality of capability set comprises at least one capability ID assigned to each capability set. The UWB configuration controller is configured to select at least one capability set from the plurality of capability set to be shared with at least one second UWB device. The UWB configuration controller is configured to share at least one of a capability ID from the plurality capability set to the at least one second UWB device based on the selection.

Accordingly, the embodiments herein disclose an UWB device including a processor, a memory, and a UWB configuration controller, coupled with the processor and the memory. An application runs in the first UWB device, wherein the application is, coupled with the UWB configuration controller, configured to define a plurality of capability set, wherein the plurality of capability set comprises at least one capability ID assigned to each capability set, select at least one capability ID from the plurality of capability set to be shared with a UWB sub-system, and share at least one of a capability ID from the plurality capability set to the UWB sub-system based on the selection.

Accordingly, the embodiments herein disclose an UWB device including a UWB configuration controller coupled with a processor and a memory. The UWB configuration controller is configured to define a plurality of capability set, wherein the plurality of capability set comprises at least one configuration ID assigned to each capability set. The UWB configuration controller is configured to select at least one capability set from the plurality of capability set to be shared with at least one second UWB device. The UWB configuration controller is configured to share at least one of a configuration ID from the plurality capability set to the at least one second UWB device based on the selection.

Accordingly, the embodiments herein disclose an UWB device including a processor, a memory, and a UWB configuration controller, coupled with the processor and the memory. An application runs in the first UWB device, wherein the application is, coupled with the UWB configuration controller, configured to define a plurality of capability set, wherein the plurality of capability set comprises at least one configuration ID assigned to each capability set, select at least one configuration ID from the plurality of capability set to be shared with a UWB sub-system, and share at least one of a configuration ID from the plurality capability set to the UWB sub-system based on the selection.

Accordingly, the embodiments herein disclose an UWB device including a UWB configuration controller coupled with a processor and a memory. The UWB configuration controller is configured to select at least one of a service based default configuration, a device class based default configuration, and a pre-defined system configuration. The UWB configuration controller is configured to enable at least one default configuration to initiate a ranging activity with at least one second UWB device based on at least one of the selected service based default configuration, the selected device class based default configuration, and the selected pre-defined system configuration.

These and other aspects of the embodiments herein will be better appreciated and understood when considered in conjunction with the following description and the accompanying drawings. It should be understood, however, that the following descriptions, while indicating at least one embodiment and numerous specific details thereof, are given by way of illustration and not of limitation. Many changes and modifications may be made within the scope of the embodiments, and the embodiments herein include all such modifications.

BRIEF DESCRIPTION OF DRAWINGS

The embodiments disclosed herein are illustrated in the accompanying drawings, throughout which like reference letters indicate corresponding parts in the various figures. The embodiments herein will be better understood from the following description with reference to the drawings, in which:

FIG. 1 shows an overview of a UWB system, according to embodiments as disclosed herein;

FIG. 2 shows various hardware components of an UWD device, according to embodiments as disclosed herein;

FIG. 3 to FIG. 8 are flow charts illustrating a method for configuring the UWB system based on a predefined configuration, according to embodiments as disclosed herein;

FIG. 9 is a flow chart illustrating a method for configuring the UWB system based on a default configuration, according to embodiments as disclosed herein; and FIG. 10 is a sequence diagram illustrating step by step operations for configuring the UWB system, according to embodiments as disclosed herein.

MODE FOR THE INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

Accordingly, the embodiments herein disclose methods for configuring an UWB system. The method includes defining, by a first UWB device, a plurality of predefined configuration associated with a plurality of service in the first UWB device. Further, the method includes selecting, by the first UWB device, at least one predefined configuration from the plurality of predefined configuration to be shared with at least one second UWB device. Further, the method includes sharing, by the first UWB device, at least one of an ID of the at least one predefined configuration from the plurality of predefined configuration, a deviated parameter and a deviated parameter value combined with the ID of the predefined configuration from the plurality of predefined configuration to the at least one second UWB device based on the selection.

The proposed method can be used to avoid the exchanging a number of parameters between the UWB devices prior to the start of ranging and exchanging the number of parameters between the application and the UWB device via the API. This results in enhancing the efficiency the UWB system in time effective manner.

Referring now to the drawings, and more particularly to FIGS. 1 through 10, where similar reference characters denote corresponding features consistently throughout the figures, there are shown at least one embodiment.

FIG. 1 shows an overview of a UWB system (1000), according to embodiments as disclosed herein. The UWB system (1000) includes one or more UWB device (100a-100n) (i.e., first UWB device (100a), second UWB device (100b), third UWB device (100c) and Nth UWB device (100*n*)). The one or more UWB device (100*a*-100*n*) is communicated with each other.

In an embodiment, a first UWB device (100*a*) is configured to define a plurality of predefined configuration associated with a plurality of service in the first UWB device (100*a*). The plurality of predefined configuration is defined by saving the plurality of predefined configuration at the first UWB device (100*a*), communicating the plurality of predefined configuration to the at least one second UWB device (100*b*-100*n*) and saving the plurality of predefined configuration at the second UWB device (100*b*-100*n*). Further, the first UWB device (100*a*) is configured to select one or more predefined configuration from the plurality of predefined configuration to be shared with the second UWB device (100*b*-100*n*). Based on the selection, the first UWB device (100*a*) is configured to share the ID of the predefined configuration from the plurality of predefined configuration, a deviated parameter and a deviated parameter value combined with the ID of the predefined configuration from the plurality of predefined configuration to the second UWB device (100*b*-100*n*). In an embodiment, the ID includes information element (IE). The IE includes a configuration ID, a device ID, a number of devices, a service ID, a subset associated with the configuration ID, a number of parameter subsets, the deviation parameter and a value associated with the deviated parameter.

The ID of predefined configuration from the plurality of predefined configuration, the deviated parameter and the deviated parameter value combined with the ID of the predefined configuration is shared using an advertisement message, a push notification, and a short range communication message.

In an embodiment, an application (140) running in the first UWB device (100*a*) configured to define the plurality of predefined configuration associated with the plurality of service in the application (140). In an embodiment, defining, by the application (140) running in the first UWB device (100*a*), the plurality of predefined configuration includes saving the plurality of predefined configuration at the application (140) running in the first UWB device (100*a*), communicating the plurality of predefined configuration to the UWB sub-subsystem (160) and saving the plurality of predefined configuration at the UWB sub-subsystem (160).

Further, the application (140) running in the first UWB device (100*a*) configured to select the predefined configuration from the plurality of configuration to be shared with a UWB sub-subsystem (160). Based on the selection, the application (140) running in the first UWB device (100*a*) configured to share the ID of the predefined configuration from the plurality of predefined configuration, the deviated parameter, and the deviated parameter value combined with the ID of the predefined configuration from the plurality of predefined configuration to the UWB sub-subsystem (160).

Below is an example for the predefined configuration library as shown in the table 1 and table 2.

TABLE 1

| Configuration 1 | |
| --- | --- |
| Parameter | Value |
| Session ID | 17 |
| Ranging Method | 0 (SS TWR) |
| Multi-Node Mode | 1 (One to many) |
| Device Role | 0 (controller) |
| Device Type | 1 (type1) |
| RFRAME Configuration | 2 (SP3) |
| ToF Report | 1 |
| AoA Elevation Report | 1 |
| . . . | . . . |
| STS Config | 1 (Dynamic STS) |

TABLE 2

| Configuration 2 | |
| --- | --- |
| Parameter | Value |
| Session ID | 12 |
| Ranging Method | 1 (DS TWR) |
| Multi-Node Mode | 1 (One to many) |
| Device Role | 1 (controllee) |
| Device Type | 2 (type2) |
| RFRAME Configuration | 2 (SP3) |
| ToF Report | 1 |
| AoA Elevation Report | 0 |
| . . . | . . . |
| STS Config | 1 (Dynamic STS) |

In one embodiment, in order to set the configuration, a specific configuration ID is shared between the UWB devices (100*a*-100*n*). In an example, a controller sends config2 to be set at a controlee over the air. In one embodiment, in order to set the configuration, a specific configuration ID is shared between the application (140) and the UWB device (100) via the API. In an example, the application (140) sends config2 to be set at the UWB device (100) via the API.

Below is example table for IEs for sharing configuration in the form of identifier as shown in the table 3 and table 4.

TABLE 3

| IE to share predefined UWB configuration in the form of Identifier between devices | size |
| --- | --- |
| Config ID | N bits |

TABLE 4

| IE to share predefined UWB configuration in the form of Identifier between App and UWB device | size |
| --- | --- |
| Config ID | N bits |

The IEs for sharing configuration in the form of identifier to multiple devices is shown in the table 5 and table 6.

TABLE 5

| IE to share predefined UWB configuration in the form of Identifier to multiple devices | size |
| --- | --- |
| Number of devices | N bits |
| List of IE to share predefined UWB configuration in the form of Identifier between devices with device ID | M * N Bits |

TABLE 6

| IE to share predefined UWB configuration in the form of Identifier between devices along with device ID | size |
| --- | --- |
| Device ID | L bits |
| Config ID | N bits |

To set a configuration, an ordered pair of service id and config id is shared between the application (140) and the UWB device (100) via the API. In an example, the application (140) sends (service1, config2) to be set at the UWB device (100) via the API In embodiment, in order to set a configuration, an ordered pair of service id and config id is shared between the UWB devices. In an example the controller sends (service1, config2) to be set at the controlee over the air.

Example predefined service dependent config. Library is shown in the table 7 and table 8.

TABLE 7

| Service 1, Configuration 1 | |
| --- | --- |
| Parameter | Value |
| Session ID | 17 |
| Ranging Method | 0 (SS TWR) |
| Multi-Node Mode | 1 (One to many) |
| Device Role | 0 (controller) |
| Device Type | 1 (type1) |
| RFRAME Configuration | 2 (SP3) |
| ToF Report | 1 |
| AoA Elevation Report | 1 |
| . . . | . . . |
| STS Config | 1 (Dynamic STS) |

TABLE 8

| Service 2, Configuration 1 | |
| --- | --- |
| Parameter | Value |
| Session ID | 12 |
| Ranging Method | 1 (DS TWR) |
| Multi-Node Mode | 1 (One to many) |
| Device Role | 1 (controllee) |
| Device Type | 2 (type2) |
| RFRAME Configuration | 2 (SP3) |
| ToF Report | 1 |
| AoA Elevation Report | 0 |
| . . . | . . . |
| STS Config | 1 (Dynamic STS) |

The IEs for sharing configuration in the form of identifier based on service identifier is shown in the table 9 and table 10.

TABLE 9

| IE to share predefined UWB configuration in the form of service dependant Identifier between devices | size |
| --- | --- |
| Service ID | N bits |
| Config ID | N bits |

TABLE 10

| IE to share predefined UWB configuration in the form of service dependant Identifier between App and UWB device | size |
| --- | --- |
| Service ID | N bits |
| Config ID | N bits |

The IEs for sharing configuration in the form of identifier based on service identifier to multiple devices is shown in the table 11 and table 12.

TABLE 11

| IE for sharing configuration in the form of identifier based on service identifier to multiple devices | size |
| --- | --- |
| Number of devices | 8 bits |
| List of IE to share predefined UWB configuration in the form of service dependant Identifier between devicesalong with device ID | variable |

TABLE 12

| IE to share predefined UWB configuration in the form of service dependant Identifier between devices along with Device ID | size |
| --- | --- |
| Device ID | L bits |
| Service ID | N bits |
| Config ID | N bits |

Example predefined sub configuration library is shown in the table 13 to table 16.

TABLE 13

| Parameter subset 1 - config1 | |
| --- | --- |
| Parameter | Value |
| Session ID | 17 |
| Ranging Method | 0 (SS TWR) |
| Multi-Node Mode | 1 (One to many) |
| Device Role | 0 (controller) |
| Device Type | 1 (type1) |

TABLE 14

| Parameter subset 2 - config1 | |
| --- | --- |
| Parameter | Value |
| RFRAME | 2 (SP3) |
| ToF Report | 1 |
| AoA Elevation Report | 0 |
| | 1 (Dynamic STS) |

TABLE 15

| Parameter subset 1 - config2 | |
| --- | --- |
| Parameter | Value |
| Session ID | 17 |
| Ranging Method | 1 (DS TWR) |
| Multi-Node Mode | 1 (One to many) |
| Device Role | 1(controllee) |
| Device Type | 2 (type2) |

TABLE 16

| Parameter subset 2 - config2 | |
| --- | --- |
| Parameter | Value |
| RFRAME Configuration | 1 (SP1) |
| ToF Report | 0 |
| AoA Elevation Report | 0 |
| | 1 (Dynamic STS) |

The IEs for sharing configuration in the form of identifier based on subsets of parameters is shown in the table 17 and table 18.

TABLE 17

| IE to share predefined UWB configuration in the form of Parameters subsets configuration Identifier between devices | size |
| --- | --- |
| Number of Parameter subsets | N bits |
| Parameter subset 1 configuration ID | N bits |

TABLE 17-continued

| IE to share predefined UWB configuration in the form of Parameters subsets configuration Identifier between devices | size |
|---|---|
| Parameter subset 2 configuration ID | N bits |
| . . . | . . . |
| Parameter subset N configuration ID | N bits |

TABLE 18

| IE to share predefined UWB configuration in the form of Parameters subsets configuration Identifier between App and UWB device | size |
|---|---|
| Number of parameter subsets | N Bits |
| Parameter subset 1 configuration ID | N Bits |
| Parameters subset 2 configuration ID | N Bits |

The IEs for sharing configuration in the form of identifier based on subsets of parameters to multiple devices is shown in the table 19 and table 20.

TABLE 19

| IE for sharing configuration in the form of identifier based on subsets of parameters to multiple devices | size |
|---|---|
| Number of devices | 8 bits |
| List of IE to share predefined UWB configuration in the form of Parameters subsets configuration Identifier between devices along with Device ID | variable |

TABLE 20

| IE to share predefined UWB configuration in the form of Parameters subsets configuration Identifier between devices along with Device ID | size |
|---|---|
| Device ID | L bits |
| Number of Parameter subsets | N bits |
| Parameter subset 1 configuration ID | N bits |
| Parameter subset 2 configuration ID | N bits |
| . . . | . . . |
| Parameter subset N configuration ID | N bits |

The IEs for sharing configuration in the form of parameter subset identifier based on service identifier is shown in the table 21 and table 22.

TABLE 21

| IE to share predefined UWB configuration in the form of service dependant parameter subset Identifier between devices | size |
|---|---|
| Service ID | N bits |
| Number of Parameter subsets | N bits |
| Service specific Parameter subset 1 configuration ID | N bits |
| . . . | . . . |
| Service specific Parameter subset M configuration ID | N bits |

TABLE 22

| IE to share predefined UWB configuration in the form of service dependant parameter subset Identifier between App and UWB device | size |
|---|---|
| Service ID | N bits |
| Number of Parameter subsets | N bits |
| Service specific Parameter subset 1 configuration ID | N bits |
| . . . | . . . |
| Service specific Parameter subset M configuration ID | N bits |

In one embodiment, in order to set the required configuration, an ordered pair of service ID, set of sub config id is shared between the UWB devices. For example, the controller sends (service1, (subconfig 1, subconfig 6)) to be set at controlee over the air. In another embodiment, in order to set the required configuration, an ordered pair of service ID, set of sub config id is shared between Application and UWB device. For example, the application sends (service1, (subconfig 1, subconfig 6)) to be set at UWB device via API The IEs for sharing configuration in the form of parameter subset identifier based on service identifier to multiple devices is shown in the table 23 and table 24.

TABLE 23

| IE for sharing configuration in the form of parameter subset identifier based on service identifier to multiple devices | size |
|---|---|
| Num of devices | 8 bits |
| List of IE to share predefined UWB configuration in the form of service dependant parameter subset Identifier between devices along with Device ID | variable |

TABLE 24

| IE to share predefined UWB configuration in the form of service dependant parameter subset Identifier between devices along with Device ID | size |
|---|---|
| Device ID | L bits |
| Service ID | N bits |
| Number of Parameter subsets | N bits |
| Service specific Parameter subset 1 configuration ID | N bits |
| . . . | . . . |
| Service specific Parameter subset M configuration ID | N bits |

The IEs for sharing configuration in the form of identifier with deviation is shown in the table 25.

TABLE 25

| IE to share predefined UWB configuration in the form of Identifier with deviation between devices | Size |
|---|---|
| Config ID | N bits |
| Number of deviation parameters | N bits |
| Deviated parameter 1 identifier | N bits |
| Deviated parameter 1 value | Size of parameter 1 |
| . . . | . . . |
| Deviated parameter M identifier | N bits |
| Deviated parameter M value | Size of parameter M |

The IEs for sharing configuration in the form of identifier with deviation to multiple devices is shown in the table 26 and table 27.

TABLE 26

| IE for sharing configuration in the form of identifier with deviation to multiple devices | size |
|---|---|
| Num of devices | 8 bits |
| List of IE to share predefined UWB configuration in the form of Identifier with deviation between devices along with device ID | variable |

TABLE 27

| IE to share predefined UWB configuration in the form of Identifier with deviation between devices along with device ID | Size |
|---|---|
| Device ID | L bits |
| Config ID | N bits |
| Number of deviation parameters | N bits |
| Deviated parameter 1 identifier | N bits |
| Deviated parameter 1 value | Size of parameter 1 |
| . . . | . . . |
| Deviated parameter M identifier | N bits |
| Deviated parameter M value | Size of parameter M |

The IEs for sharing configuration in the form of identifier with deviation is shown in the table 28.

TABLE 28

| IE to share predefined UWB configuration in the form of Identifier with deviation between app and UWB device | Size |
|---|---|
| Config ID | N bits |
| Number of deviation parameters | N bits |
| Deviated parameter 1 identifier | N bits |
| Deviated parameter 1 value | Size of parameter 1 |
| . . . | . . . |
| Deviated parameter M identifier | N bits |
| Deviated parameter M value | Size of parameter M |

In an embodiment, the first UWB device (100a) is configured to define a plurality of capability set. The plurality of capability set is defined by saving the plurality of plurality of capability set at the first UWB device (100a), communicating the plurality of capability set to the at least one second UWB device (100b-100n) and saving the plurality of capability set at the second UWB device (100b-100n). The plurality of capability set includes a capability ID assigned to each capability set. the first UWB device (100a) is configured to select the capability set from the plurality of capability set to be shared with the second UWB device (100b-100n). Based on the selection, the first UWB device (100a) is configured to share a capability ID from the plurality capability set to the second UWB device (100b-100n). The capability ID is exchanged using an advertisement message, a push notification, and a short range communication message.

In an embodiment, the application (140) running in the first UWB device (100a) configured to define the plurality of capability set. In an embodiment, the plurality of capability set is defined by saving the plurality of capability set at the application (140) running in the first UWB device (100a), communicating the plurality of capability set to the UWB sub-subsystem (160) and saving the plurality of capability set at the UWB sub-subsystem (160). The plurality of capability set includes a capability ID assigned to each capability set. Further, the application (140) running in the first UWB device (100a) configured to select the capability ID from the plurality of capability set to be shared with the UWB sub-system (160). Based on the selection, the application (140) running in the first UWB device (100a) is configured to share the capability ID from the plurality capability set to the UWB sub-system (160).

In one embodiment, in order to exchange the capability info, a specific capability ID is shared between UWB devices. In an example, the controlee sends capability2 to controller over the air. In another embodiment, in order to exchange the capability info, a specific capability ID is shared between the application and UWB device (100) via API. In an example, the UWB device (100) sends the capability2 to the application over the air.

The IEs for sharing capability in the form of capability identifiers as shown in the table 29 and table 30.

TABLE 29

| IE to share supported capability as set of capability identifiers between UWB devices | size |
|---|---|
| Capability ID | N bits |

TABLE 30

| IE to share supported capability as set of capability identifier between APP and UWB device | size |
|---|---|
| Capability ID | N bits |

In an embodiment, the first UWB device (100a) is configured to define the plurality of capability set. The plurality of capability set includes configuration ID assigned to each capability set. The plurality of capability set is defined by saving the plurality of capability set at the first UWB device (100a) from the second UWB device (100b-100n). Further, the first UWB device (100a) is configured to select the capability set from the plurality of capability set to be shared with the second UWB device (100b-100n). based on the selection, the first UWB device (100a) is configured to share the configuration ID from the plurality capability set to the at least one second UWB device (100b-100n). The configuration ID is shared using an advertisement message, a push notification, and a short range communication message.

In an embodiment, the application (140) running in the first UWB device (100a) configured to define the plurality of capability set and select the configuration ID from the plurality of capability set to be shared with the UWB sub-system (160). Based on the selection, the application (140) is configured to share the configuration ID from the plurality capability set to the UWB sub-system (160).

In one embodiment, in order to exchange the capability info, a set of configuration ID is shared between the UWB devices. In an example, the controlee sends config1, config2, config3 to the controller over the air.

In one embodiment, in order to exchange the capability info, a set of configuration ID is shared between the application (140) and the UWB device (100) via the API. In an example, the controlee sends config1, config2, config3 to the controller over the air.

IEs for sharing capability in the form of config identifiers is shown in the table 31 and table 32.

TABLE 31

| IE to share supported capability as set of config identifiers between UWB devices | size |
|---|---|
| config ID | N bits |

TABLE 32

| IE to share supported capability as set of config identifier between APP and UWB device | size |
|---|---|
| config ID | N bits |

In an embodiment, the first UWB device (100a) is configured to select one or more service based default configuration, a device class based default configuration, and a pre-defined system configuration. Based on one or more selected service based default configuration, the selected device class based default configuration, and the selected pre-defined system configuration, the first UWB device (100a) is configured to enable the default configuration to initiate a ranging activity with the second UWB device (100b-100n).

In an example, a set of parameters are identified in the UWB system (1000) which need to be configured before starting the ranging activity. Each parameter assumes one value (among many possible), and the set of values form a configuration. Below is example of UWB configuration parameters as shown in the table 33.

TABLE 33

| Parameter | Value |
|---|---|
| Session ID | 1 |
| Ranging Method | 0 (SS TWR) |
| Multi-Node Mode | 1 (One to many) |
| Device Role | 0 (controller) |
| Device Type | 1 (type1) |
| RFRAME Configuration | 2 (SP3) |
| ToF Report | 1 |
| AoA Elevation Report | 1 |
| . . . | . . . |
| STS Config | 1 (Dynamic STS) |

In one embodiment, based on the service information/ID exchanged, default configuration for that service is applied/loaded at UWB devices and application, when no configuration exchanged before ranging.

In another embodiment, based on the service information/ID enabled from upper layer, default configuration for that service is applied/loaded at UWB devices and application, when no configuration exchanged before ranging.

In one embodiment, based on the device class information/ID exchanged, default configuration for that device class is applied/loaded at UWB devices as well as application, when no configuration exchanged before ranging.

In another embodiment, based on the device class information/ID enabled from upper layer, default configuration for that device class is applied/loaded at UWB devices as well as application, when no configuration exchanged before ranging.

FIG. 2 shows various hardware components of the UWD device (100), according to embodiments as disclosed herein. In an embodiment, the UWD device (100) includes a processor (110), a communicator (120), a memory (130), an application (140), a UWB configuration controller (150) and a UWB Sub-system (160). The processor (110) is coupled with the communicator (120), the memory (130), the application (140), the UWB configuration controller (150) and the UWB Sub-system (160).

In an embodiment, the UWB configuration controller (150) is configured to define the plurality of predefined configuration associated with the plurality of service in the first UWB device (100a). Further, the UWB configuration controller (150) is configured to select the predefined configuration from the plurality of predefined configuration to be shared with the second UWB device (100b) and Nth UWB device (100n). Based on the selection, the UWB configuration controller (150) is configured to share the ID of the predefined configuration from the plurality of predefined configuration, the deviated parameter and the deviated parameter value combined with the ID of the predefined configuration from the plurality of predefined configuration to the the second UWB device (100b) and Nth UWB device (100n).

In an embodiment, the application (140) running in the first UWB device (100a) configured to define the plurality of predefined configuration associated with the plurality of service in the application (140). Further, the application (140) running in the first UWB device (100a) configured to select the predefined configuration from the plurality of configuration to be shared with the UWB sub-subsystem (160). Based on the selection, the application (140) running in the first UWB device (100a) configured to share the ID of the predefined configuration from the plurality of predefined configuration, the deviated parameter, and the deviated parameter value combined with the ID of the predefined configuration from the plurality of predefined configuration to the UWB sub-subsystem (160).

In an embodiment, the UWB configuration controller (150) is configured to define the plurality of capability set. The plurality of capability set includes the capability ID assigned to each capability set. Further, the UWB configuration controller (150) is configured to select the capability set from the plurality of capability set to be shared with the second UWB device (100b-100n). Based on the selection, the UWB configuration controller (150) is configured to share the capability ID from the plurality capability set to the second UWB device (100b-100n).

In an embodiment, the application (140) running in the first UWB device (100a) is configured to define the plurality of capability set. The plurality of capability set includes the capability ID assigned to each capability set. Further, the application (140) running in the first UWB device (100a) configured to select the capability ID from the plurality of capability set to be shared with the UWB sub-system (160). Based on the selection, the application (140) is configured to share the capability ID from the plurality capability set to the UWB sub-system (160).

In an embodiment, the UWB configuration controller (150) is configured to define the plurality of capability set. The plurality of capability set includes configuration ID assigned to each capability set. Further, the UWB configuration controller (150) is configured to select the capability set from the plurality of capability set to be shared with the second UWB device (100b-100n). Based on the selection, the UWB configuration controller (150) is configured to share the configuration ID from the plurality capability set to the at least one second UWB device (100b-100n).

In an embodiment, the application (140) running in the first UWB device (100a) is configured to define the plurality of capability set and select the configuration ID from the plurality of capability set to be shared with the UWB sub-system (160). Based on the selection, the application (140) is configured to share the configuration ID from the plurality capability set to the UWB sub-system (160).

In an embodiment, the UWB configuration controller (150) is configured to select one or more service based default configuration, the device class based default configuration, and the pre-defined system configuration. Based on one or more selected service based default configuration, the selected device class based default configuration, and the selected pre-defined system configuration, the UWB configuration controller (150) is configured to enable the default configuration to initiate a ranging activity with the second UWB device (100*b*-100*n*).

The UWB configuration controller (150) is physically implemented by analog or digital circuits such as logic gates, integrated circuits, microprocessors, microcontrollers, memory circuits, passive electronic components, active electronic components, optical components, hardwired circuits, or the like, and may optionally be driven by firmware.

Further, the processor (110) is configured to execute instructions stored in the memory (130) and to perform various processes. The communicator (120) is configured for communicating internally between internal hardware components and with external devices via one or more networks. The memory (130) also stores instructions to be executed by the processor (110). The memory (130) may include nonvolatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In certain examples, a non-transitory storage medium may store data that can, over time, change (e.g., in Random Access Memory (RAM) or cache).

Further, at least one of the plurality of modules/controller may be implemented through the AI model. A function associated with the AI model may be performed through the non-volatile memory, the volatile memory, and the processor (110). The processor (110) may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors control the processing of the input data in accordance with a predefined operating rule or AI model stored in the non-volatile memory and the volatile memory. The predefined operating rule or artificial intelligence model is provided through training or learning.

Here, being provided through learning means that a predefined operating rule or AI model of a desired characteristic is made by applying a learning algorithm to a plurality of learning data. The learning may be performed in a device itself in which AI according to an embodiment is performed, and/o may be implemented through a separate server/system.

The AI model may comprise of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

Although the FIG. 2 shows various hardware components of the UWB device (100) but it is to be understood that other embodiments are not limited thereon. In other embodiments, the UWB device (100) may include less or more number of components. Further, the labels or names of the components are used only for illustrative purpose and does not limit the scope of the invention. One or more components can be combined together to perform same or substantially similar function in the UWB device (100).

FIG. 3 to FIG. 8 are flow charts (300-800) illustrating a method for configuring the UWB system (1000) based on a predefined configuration, according to embodiments as disclosed herein.

As shown in the FIG. 3, the operations (302-306) are performed by the UWB configuration controller (150). At 302, the method includes defining the plurality of predefined configuration associated with the plurality of service in the first UWB device (100*a*). At 304, the method includes selecting the predefined configuration from the plurality of predefined configuration to be shared with the second UWB device (100*b*-100*n*). At 306, the method includes sharing the ID of the predefined configuration from the plurality of predefined configuration, the deviated parameter and the deviated parameter value combined with the ID of the predefined configuration from the plurality of predefined configuration to the second UWB device (100*b*-100*n*) based on the selection.

As shown in the FIG. 4, at 402, method includes defining the plurality of predefined configuration associated with the plurality of service in the application (140). At 404, the method includes selecting the predefined configuration from the plurality of configuration to be shared with the UWB sub-subsystem (160). At 406, the method includes sharing the ID of the predefined configuration from the plurality of predefined configuration, the deviated parameter, and the deviated parameter value combined with the ID of the predefined configuration from the plurality of predefined configuration to the UWB sub-subsystem (160) based on the selection.

As shown in the FIG. 5, the operations (502-506) are performed by the UWB configuration controller (150). At 502, the method includes defining the plurality of capability set. The plurality of capability set includes the capability ID assigned to each capability set. At 504, the method includes selecting the capability set from the plurality of capability set to be shared with the second UWB device (100*b*-100*n*). At 506, the method includes sharing the capability ID from the plurality capability set to the second UWB device (100*b*-100*n*) based on the selection.

As shown in the FIG. 6, at 602, the method includes defining the plurality of capability set, where the plurality of capability set includes the capability ID assigned to each capability set. At 604, the method includes selecting the capability ID from the plurality of capability set to be shared with the UWB sub-system (160). At 606, the method includes sharing the capability ID from the plurality capability set to the UWB sub-system (160) based on the selection.

As shown in the FIG. 7, the operations (702-706) are performed by the UWB configuration controller (150). At 702, the method includes defining the plurality of capability set, where the plurality of capability set includes the configuration ID assigned to each capability set. At 704, the method includes selecting the capability set from the plurality of capability set to be shared with the second UWB device (100b-100n). At 706, the method includes sharing the configuration ID from the plurality capability set to the second UWB device (100b-100n) based on the selection.

As shown in the FIG. 8, at 802, the method includes defining the plurality of capability set, where the plurality of capability set includes the configuration ID assigned to each capability set. At 804, the method includes selecting the configuration ID from the plurality of capability set to be shared with the UWB sub-system (160). At 806, the method includes sharing the configuration ID from the plurality capability set to the UWB sub-system (160) based on the selection.

FIG. 9 is a flow chart (900) illustrating a method for configuring the UWB system (1000) based on the default configuration, according to embodiments as disclosed herein. The operations (902 and 904) are performed by the UWB configuration controller (150).

At 902, method includes selecting the one or more service based default configuration, the device class based default configuration, and the pre-defined system configuration. At 904, the method includes enabling the default configuration to initiate the ranging activity with the second UWB device (100b-100n) based on the selected service based default configuration, the selected device class based default configuration, and the selected pre-defined system configuration.

FIG. 10 is a sequence diagram illustrating step by step operations for configuring the UWB system (1000), according to embodiments as disclosed herein. At 1002a, the first UWB device (100a) advertises the IE having pre-defined config ID to the second UWB device (100b). At 1002b, the first UWB device (100a) advertises the IE having pre-defined config ID to the third UWB device (100c). At 1004a, the second UWB device (100b) initiates the UWB ranging with UWB configuration corresponding to the Config ID in advertisement. At 1004b, the third UWB device (100c) initiates the UWB ranging with UWB configuration corresponding to the Config ID in advertisement.

IEs for UWB Ranging using Advertisement of Pre-defined configuration as shown in the table 34.

TABLE 34

| IE to configuration as config identifiers between UWB devices | Size |
| --- | --- |
| config ID | N bits |
| Number of Receivers (n) | M bits |
| List of Receiver MAC Addresses | n * size of (MAC address) |

The IEs for UWB Ranging using Advertisement of Pre-defined configuration to multiple devices as shown in the table 35 and table 36.

TABLE 35

| IEs for UWB Ranging using Advertisement of Pre-defined configuration to multiple devices | Size |
| --- | --- |
| Num of devices | 8 bits |
| List of IE to configuration as config identifiers between UWB devices along with Device ID | Variable |

TABLE 36

| IE to configuration as config identifiers between UWB devices along with Device ID | Size |
| --- | --- |
| Device ID | L bits |
| config ID | N bits |
| Number of Receivers (n) | M bits |
| List of Receiver MAC Addresses | n * size of (MAC address) |

The various actions, acts, blocks, steps, or the like in the flow charts (300-900) may be performed in the order presented, in a different order or simultaneously. Further, in some embodiments, some of the actions, acts, blocks, steps, or the like may be omitted, added, modified, skipped, or the like without departing from the scope of the invention.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of at least one embodiment, those skilled in the art will recognize that the embodiments herein can be practiced with modification within the scope of the embodiments as described herein.

The invention claimed is:

1. A method performed by a first ultra-wideband (UWB) device for configuring a UWB system, the method comprising:

identifying a service identifier (ID) and a configuration ID;

selecting a UWB configuration based on the service ID and the configuration ID;

obtaining an ID of a deviated parameter and a value of the deviated parameter based on the UWB configuration; and transmitting, to at least one second UWB device, an advertisement message, wherein the advertisement message includes:

the configuration ID, the service ID, the ID of the deviated parameter, and the value of the deviated parameter.

2. The method of claim 1, wherein an application is running in the first UWB device.

3. A first ultra-wideband (UWB) device for configuring an UWB system, the first UWB device comprising:

a transceiver; and at least one processor coupled to the transceiver and configured to:

identify a service identifier (ID) and a configuration ID;

select a UWB configuration based on the service ID and the configuration ID;

obtain an ID of a deviated parameter and a value of the deviated parameter based on the UWB configuration; and transmit, to at least one second UWB device, an advertisement message, wherein the advertisement message includes:

the configuration ID, the service ID, the ID of the deviated parameter, and the value of the deviated parameter.

4. The first UWB device of claim 3, wherein an application is running in the first UWB device.

5. A method performed by a second ultra-wideband (UWB) device for configuring a UWB system, the method comprising:

identifying a service identifier (ID) and a configuration ID;

selecting a UWB configuration based on the service ID and the configuration ID;

obtaining an ID of a deviated parameter and a value of the deviated parameter based on the UWB configuration;

receiving, from a first UWB device, an advertisement message; and applying the UWB configuration based on the ID of the deviated parameter and the value of the deviated parameter, wherein the advertisement message includes:

the configuration ID, the service ID, the ID of the deviated parameter, and the value of the deviated parameter.

6. The method of claim 5, wherein an application is running in the second UWB device.

7. A second ultra-wideband (UWB) device for configuring a UWB system, the second UWB device comprising:

a transceiver; and at least one processor coupled to the transceiver and configured to:

identify a service identifier (ID) and a configuration ID;

select a UWB configuration based on the service ID and the configuration ID;

obtain an ID of a deviated parameter and a value of the deviated parameter based on the UWB configuration;

receive, from a first UWB device, an advertisement message; and apply the UWB configuration based on the ID of the deviated parameter and the value of the deviated parameter, wherein the advertisement message includes:

the configuration ID, the service ID, the ID of the deviated parameter, and the value of the deviated parameter.

8. The second UWB device of claim 7, wherein an application is running in the second UWB device.

* * * * *